United States Patent
Ourabah et al.

(10) Patent No.: US 11,312,359 B2
(45) Date of Patent: Apr. 26, 2022

(54) METHOD FOR CALCULATING A MANAGEMENT SETPOINT FOR MANAGING THE FUEL AND ELECTRIC POWER CONSUMPTION OF A HYBRID MOTOR VEHICLE

(71) Applicant: RENAULT s.a.s., Boulogne-Billancourt (FR)

(72) Inventors: Abdel-Djalil Ourabah, Paris (FR); Benjamin Quost, Compiegne (FR); Thierry Denoeux, Compiegne (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 369 days.

(21) Appl. No.: 16/475,898

(22) PCT Filed: Dec. 20, 2017

(86) PCT No.: PCT/FR2017/053718
§ 371 (c)(1),
(2) Date: Jul. 3, 2019

(87) PCT Pub. No.: WO2018/127644
PCT Pub. Date: Jul. 12, 2018

(65) Prior Publication Data
US 2019/0344775 A1 Nov. 14, 2019

(30) Foreign Application Priority Data
Jan. 5, 2017 (FR) ........................................ 1750110

(51) Int. Cl.
*B60W 20/12* (2016.01)
*B60W 10/06* (2006.01)
(Continued)

(52) U.S. Cl.
CPC ............ *B60W 20/12* (2016.01); *B60W 50/00* (2013.01); *B60K 6/20* (2013.01); *B60W 10/06* (2013.01);
(Continued)

(58) Field of Classification Search
CPC .. B60W 50/0097; B60W 50/00; B60W 20/12; B60W 2510/244; B60W 2510/623;
(Continued)

(56) References Cited

U.S. PATENT DOCUMENTS 9,193,351 B2 * 11/2015 Zhao ...................... B60K 6/445
10,076,970 B2 * 9/2018 Khosravi ................ B60L 58/12
(Continued)

FOREIGN PATENT DOCUMENTS

CN   110139789 A * 8/2019 .............. B60L 58/16
CN   110167808 A * 8/2019 ........ B60W 50/0097
(Continued)

OTHER PUBLICATIONS

S. Nazari, J. Siegel and A. Stefanopoulou, "Optimal Energy Management for a Mild Hybrid Vehicle With Electric and Hybrid Engine Boosting Systems," in IEEE Transactions on Vehicular Technology, vol. 68, No. 4, pp. 3386-3399, Apr. 2019, doi: 10.1109/TVT.2019.2898868.*
(Continued)

*Primary Examiner* — Cuong H Nguyen
(74) *Attorney, Agent, or Firm* — Oblon, McClelland, Maier & Neustadt, L.L.P.

(57) ABSTRACT

A method for calculating a management setpoint for managing fuel and electric power consumption of a hybrid motor vehicle. The method includes: a) acquiring, via a navigation system, a journey to be made, b) dividing the journey into successive sections, c) acquiring, for each section, attributes characterizing the section, d) deducing a relation linking the
(Continued)

estimated fuel consumption of the hybrid motor vehicle over the section to the estimated electric power consumption of the hybrid motor vehicle, e) measuring the actual fuel consumption and the actual electric power consumption of the motor vehicle, f) correcting the relation, taking into account the actual fuel and electric power consumptions, and g) determining an optimal consumption point in each of the corrected relations in order to minimize the fuel consumption of the motor vehicle over the journey as a whole.

10 Claims, 4 Drawing Sheets

(51) Int. Cl.
*B60W 10/08* (2006.01)
*B60W 50/00* (2006.01)
*B60K 6/20* (2007.10)

(52) U.S. Cl.
CPC ..... *B60W 10/08* (2013.01); *B60W 2050/0013* (2013.01); *B60W 2552/15* (2020.02); *B60W 2556/50* (2020.02); *B60Y 2200/92* (2013.01)

(58) Field of Classification Search
CPC ......... B60W 2555/60; B60W 2552/05; B60W 10/08; B60W 2552/20; B60W 2552/30; B60W 2050/0089; B60W 2552/15; B60W 2050/0013; B60K 6/20; B60Y 2200/92; Y02T 10/84; Y02T 10/40; Y02T 10/70; Y02T 10/62
USPC ........................ 701/22; 180/65.265; 903/930
See application file for complete search history.

(56) References Cited

U.S. PATENT DOCUMENTS

| | | | | |
|---|---|---|---|---|
| 2011/0202221 A1* | 8/2011 | Sobue | ................... | B60K 16/00 701/22 |
| 2015/0046000 A1* | 2/2015 | Zhao | ...................... | B60K 6/445 701/22 |
| 2015/0202990 A1* | 7/2015 | Grossard | ................ | G06Q 50/30 701/22 |
| 2016/0167642 A1* | 6/2016 | Debert | ................ | B60W 30/188 701/22 |
| 2017/0151884 A1* | 6/2017 | Khosravi | ................ | B60L 53/00 |
| 2018/0281620 A1* | 10/2018 | Ourabah | ............. | B60L 15/2045 |
| 2019/0344777 A1* | 11/2019 | Ourabah | ........... | B60W 50/0097 |

FOREIGN PATENT DOCUMENTS

| | | | | |
|---|---|---|---|---|
| DE | 102 26 143 A1 | 1/2004 | | |
| DE | 102014214763 A1 * | 2/2015 | ............. | B60K 6/445 |
| DE | 10 2014 210 539 A1 | 12/2015 | | |
| DE | 10 2015 209 883 A1 | 12/2016 | | |
| EP | 2 857 271 A2 | 4/2015 | | |
| WO | WO 2014/177786 A1 | 11/2014 | | |
| WO | WO-2018127644 A1 * | 7/2018 | ........ | B60W 50/0097 |
| WO | WO-2018127645 A1 * | 7/2018 | ............ | B60W 10/08 |

OTHER PUBLICATIONS

Liang Li et al., "A novel combinatorial optimization algorithm for energy management strategy of plug-in hybrid electric vehicle", Journal of the Franklin Institute, vol. 354, Issue 15, Oct. 2017, pp. 6588-6609.*

X. Hu, T. Liu, X. Qi and M. Barth, "Reinforcement Learning for Hybrid and Plug-In Hybrid Electric Vehicle Energy Management: Recent Advances and Prospects," in IEEE Industrial Electronics Magazine, vol. 13, No. 3, pp. 16-25, Sep. 2019, doi: 10.1109/MIE. 2019.2913015.*

M. Karmakar and A. K. Nandi, "Trip planning for electric vehicle through optimal driving using genetic algorithm," 2016 IEEE 1st International Conference on Power Electronics, Intelligent Control and Energy Systems (ICPEICES), 2016, pp. 1-6, doi: 10.1109/ ICPEICES.2016.7853336.*

Freeway Driving Cycle Construction Based on Real-Time Traffic Information and Global Optimal Energy Management for Plug-In Hybrid Electric Vehicles; Hongwen He et al. (Year: 2017).*

International Search Report dated Mar. 14, 2018 in PCT/FR2017/ 053718 filed on Dec. 20, 2017.

French Preliminary Search Report dated Sep. 25, 2017 in French Application 1750110 filed on Jan. 5, 2017.

* cited by examiner

Fig.1

| | T1 | | T2 | | T3 | | ... | TN | |
|---|---|---|---|---|---|---|---|---|---|
| | Attribute | Value | Attribute | Value | Attribute | Value | | Attribute | Value |
| | FC | 2 | FC | 3 | FC | 6 | | FC | 1 |
| | SC | 5 | SC | 4 | SC | 1 | | SC | 6 |
| | SL | 70 km/h | SL | 60 km/h | SL | 130 km/h | | SL | 30 km/h |
| | TS | 43 km/h | TS | 74 km/h | TS | 97 km/h | | TS | 35 km/h |
| | RG | 3% | RG | -5% | RG | 0% | | RG | 0% |
| | LL | 12km | LL | 8km | LL | 29km | | LL | 1km |

Fig.2

| T1 | T2 | T3 | ... | TN |
|---|---|---|---|---|
| | | | | |
| $\psi_2^1$ | $\psi_2^2$ | $\psi_2^3$ | | $\psi_2^N$ |
| $\psi_1^1$ | $\psi_1^2$ | $\psi_1^3$ | | $\psi_1^N$ |
| $\psi_0^1$ | $\psi_0^2$ | $\psi_0^3$ | | $\psi_0^N$ |
| $\Delta SoEmin^1$ | $\Delta SoEmin^2$ | $\Delta SoEmin^3$ | | $\Delta SoEmin^N$ |
| $\Delta SoEmax^1$ | $\Delta SoEmax^2$ | $\Delta SoEmax^3$ | | $\Delta SoEmax^N$ |
| $RG^1$ | $RG^2$ | $RG^3$ | | $RG^N$ |
| $LL^1$ | $LL^2$ | $LL^3$ | | $LL^N$ |

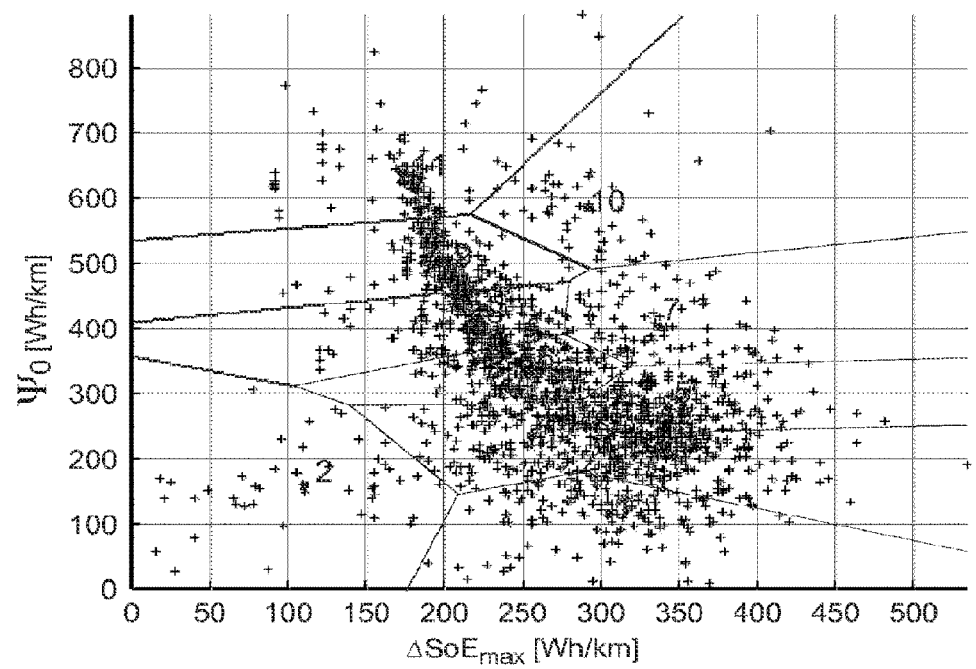

Fig.3

| Attributes name | CE_i value | $CE_1$ | $CE_2$ | $CE_3$ | $CE_4$ | ... | $CE_{11}$ |
|---|---|---|---|---|---|---|---|
| FC | 1 | | | | | | |
| FC | 2 | $a_1$ | $a_2$ | $a_3$ | $a_4$ | ... | $a_{11}$ |
| FC | ... | | | | | | |
| FC | 6 | | | | | | |
| SC | 1 | | | | | | |
| SC | 2 | | | | | | |
| SC | ... | | | | | | |
| SC | 6 | $b_1$ | $b_2$ | $b_3$ | $b_4$ | ... | $b_{11}$ |
| SL | 30 | $c_1$ | $c_2$ | $c_3$ | $c_4$ | ... | $c_{11}$ |
| SL | ... | | | | | | |
| SL | 130 | | | | | | |
| NL | 1 | | | | | | |
| NL | 2 | $d_1$ | $d_2$ | $d_3$ | $d_4$ | ... | $d_{11}$ |
| NL | ≥3 | | | | | | |
| SMS | <20 | | | | | | |
| SMS | 20-40 | | | | | | |
| SMS | 40-60 | | | | | | |
| SMS | 60-80 | $e_1$ | $e_2$ | $e_3$ | $e_4$ | ... | $e_{11}$ |
| SMS | 80-100 | | | | | | |
| SMS | >100 | | | | | | |
| TS | <20 | | | | | | |
| TS | 20-40 | | | | | | |
| TS | 40-60 | $f_1$ | $f_2$ | $f_3$ | $f_4$ | ... | $f_{11}$ |
| TS | 60-80 | | | | | | |
| TS | 80-100 | | | | | | |
| TS | >100 | | | | | | |

TAB

METHOD FOR CALCULATING A MANAGEMENT SETPOINT FOR MANAGING THE FUEL AND ELECTRIC POWER CONSUMPTION OF A HYBRID MOTOR VEHICLE

TECHNICAL FIELD TO WHICH THE INVENTION RELATES

The present invention generally relates to rechargeable hybrid vehicles.

It more particularly relates to a method for computing settings for managing the fuel and electric current consumption of a hybrid motor vehicle comprising at least one electric motor supplied with electric current by a traction battery, and an internal combustion engine supplied with fuel.

The invention is particularly advantageously applicable to hybrid vehicles of long battery life, i.e. vehicles capable of being driven using their electric motor alone over a distance of at least more than 10 kilometers.

TECHNOLOGICAL BACKGROUND

A rechargeable hybrid vehicle comprises a conventional internal combustion drivetrain (with an internal combustion engine and a fuel tank) and an electric drivetrain (with an electric motor and a traction battery able to be charged via a power plug).

Such a hybrid vehicle is capable of being driven by its electric drivetrain alone, or by its internal combustion drivetrain alone, or even simultaneously by both its electric and internal combustion drivetrains. It is also possible to recharge the traction battery using the power produced by the internal combustion motor, or even by harvesting kinetic energy developed by the motor vehicle during braking.

Due to lack of knowledge of the future route of the vehicle, the strategy currently implemented with respect to use of each of the drivetrains consists in systematically starting to discharge the traction battery at the start of the route until a minimum energy level is reached, then in subsequently using the internal combustion drivetrain. In this way, when the driver drives short routes and is regularly able to recharge the traction battery, he maximizes use of the electric drivetrain, this decreasing the polluting emissions of the vehicle.

However, this strategy does not always guarantee a minimum fuel consumption. This is in particular the case when the route of the user starts with a freeway section and ends with an urban section. Specifically, the electric drivetrain is unsuitable for use on freeways since the traction battery discharges very quickly thereon, and the internal combustion drivetrain is unsuitable for use in urban surroundings since the efficiency of the internal combustion engine is lower in an urban setting than on a freeway.

With the aim of mitigating this drawback, document U.S. Pat. No. 8,825,243 proposes to construct an "ideal" battery discharge curve, on the basis of a route prediction known by a navigation system. This curve is then constructed in such a way that the state of charge of the battery reaches its minimum permitted value only at the end of the route. The hybrid system may then be driven in accordance with this route prediction, so as to best follow this discharge curve. The drawback of such a solution is that in case of a substantial diversity in the road conditions on the route (for example the simple but very common case where the route starts with an urban first section, then continues with a freeway second section and lastly ends with an urban third section), the route is not driven optimally from the point of view of energy consumption.

Furthermore, use of the internal combustion drivetrain in an urban setting is less pleasant for the driver than use of the electric drivetrain.

Lastly, legislation sometimes prevents the use of internal combustion engines in an urban setting, meaning that it is no longer possible to use them there.

In order to remedy these various drawbacks, the applicant has developed a first technical solution that is described in detail in a patent application filed with the INPI under the reference FR1556271 (this application had not yet been published at the time of filing of the present patent application).

This first technical solution consists, in summary, in:
 determining, by means of a navigation system, what will be the characteristics of each segment of the input route,
 determining, for each of the segments, what will be the mathematical relationship relating the fuel consumption of the internal combustion engine to the current consumption of the electric motor,
 choosing an optimal point of the mathematical relationship for each segment so that the fuel consumption profile is optimized for the route to be traveled.

In other words, this first technical solution allows road-related events, such as downhill sections, uphill sections, freeway sections and urban sections, to be anticipated, and the best way in which to use electric resources in order to decrease the fuel consumption of the vehicle over the entirety of the route to be computed in advance.

The drawback of this first technical solution is that unexpected factors may cause the energy consumption of the vehicle to increase, so that the predicted fuel consumption profile is no longer correct. The risk is then that the battery will no longer be able to deliver the desired amount of electric energy, the fuel consumption of the engine increasing as a result.

SUMMARY OF THE INVENTION

In order to remedy the aforementioned drawbacks of the prior art, the present invention proposes to make the system more robust to perturbations related to unexpected factors that modify the energy consumption of the vehicle.

More particularly, according to the invention, a computing method such as defined in the introduction is proposed, in which method provision is made for steps of:
 a) acquiring, by means of a navigation system, a route to be traveled,
 b) dividing said route into successive segments,
 c) acquiring, for each segment, attributes characterizing said segment,
 d) for each of said segments and taking into account the attributes thereof, acquiring a relationship relating the estimated fuel consumption of the hybrid motor vehicle on the segment to its estimated electric energy consumption,
 e) measuring the actual fuel consumption and the actual electric energy consumption of the motor vehicle,
 f) correcting, taking into account said actual fuel consumption and said actual electric energy consumption, each relationship,
 g) determining an optimal consumption point in each of the corrected relationships, and
 h) generating energy managing settings throughout the route, depending on the coordinates of said optimal points.

Measurement of the actual energy consumption of the vehicle (in fuel and in electric energy) then allows the prediction of the energy consumption over the entirety of the remaining route to be corrected "in real time".

This correction thus allows a better prediction to be obtained, which prediction is not misguided by unexpected factors such as for example:

increase of the load of the vehicle (due to the number of passengers in the vehicle, to filling of the trunk, to the hitching of a trailer, etc.), increase in the forces resisting the advance of the vehicle (due to placement of luggage on the roof of the vehicle, or to windows being opened, or to a deflated tire, etc.), ageing of components of the vehicle (due to a degradation of the internal combustion engine, of the traction battery, of the electric motor, etc.), temperature variations, which are known to have an impact on the efficiency of traction batteries and internal combustion engines.

Therefore, the invention allows the system to be made more robust to external perturbations and to ageing of the components of the vehicle.

It furthermore allows the difference between the estimated consumption displayed to the driver at the start of the route and the actual consumption displayed once the destination has been reached to be decreased.

Thus, this solution allows the confidence of the driver in this system to be increased, this possibly inciting him to attempt to further decrease his energy consumption.

Lastly, in the case where the motor vehicle must pass through zones where polluting vehicles are forbidden, this solution allows these zones to be reached with a traction battery that is charged enough for these zones to be passed through using the electric motor alone.

The following are other advantageous and nonlimiting features of the computing method according to the invention:

step d) comprises selecting, from a plurality of predetermined relationships relating fuel consumption values to electric energy consumption values, the relationship that corresponds to the attributes characterizing said segment;

the predetermined relationships are polynomials and step f) consists in revising the value of the ordinate at the point of origin of the selected polynomial;

the value of the ordinate of the selected polynomial is revised by adding thereto a variable that is equal to the difference between, on the one hand, the value of the ordinate at the point of origin of a polynomial relating the actual fuel consumption of the hybrid motor vehicle to its actual electric energy consumption over at least one portion of an already traveled segment, and, on the other hand, the value of the ordinate at the point of origin of the selected polynomial over said at least one portion of the already traveled segment;

the polynomials are of second-order and the variations in the charge and discharge of the traction battery are bounded between a minimum threshold and a maximum threshold;

said polynomials have two invariable coefficients and an ordinate value at the point of origin that varies from one polynomial to the next;

in step d), the relationship is selected independently of the gradient of said segment, and, prior to step f), provision is made for a step d1) of correcting said relationship to take into account said gradient;

in step d), the relationship is selected independently of the way in which the driver is driving the motor vehicle, and, prior to step f), provision is made for a step d3) of correcting said relationship to take into account said way in which the driver is driving the motor vehicle;

in step d), the relationship is selected independently of the electric current consumption of auxiliary devices that are distinct from the electric motor and that are supplied with current by the traction battery, and, prior to step f), provision is made for a step d2) of correcting said relationship to take into account said electric current consumption of the auxiliary devices; and in step g), the optimal points are chosen such that they minimize the fuel consumption of the hybrid motor vehicle over all of the route and maximize the discharge of the traction battery at the end of said route;

BRIEF DESCRIPTION OF THE DRAWINGS

The following description, which is given with reference to the appended drawings, which are given by way of nonlimiting example, will allow of what the invention consists and how it may be implemented to be clearly understood.

In the Appended Drawings:

FIG. 1 is a table illustrating the values of attributes characterizing segments of a route that a vehicle must travel;

FIG. 2 is a table illustrating the parameters of reference curves characterizing the segments of the route to be traveled;

FIG. 3 is a graph illustrating the distribution of specific consumption curves acquired during test drives;

DETAILED DESCRIPTION

Figures 4, 5:
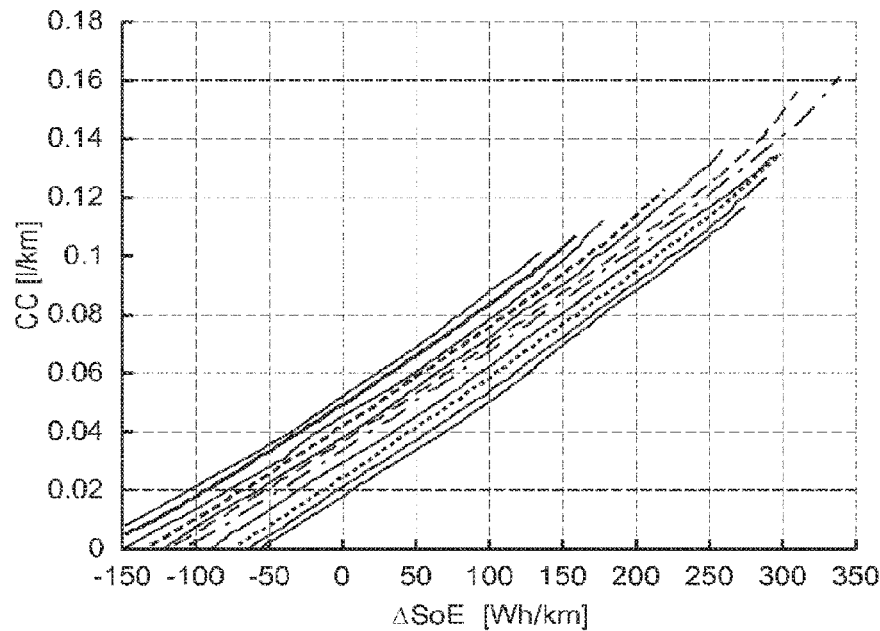
FIG. 4 is a graph illustrating a plurality of reference curves.
FIG. 5 is a table associating, with each attribute value assigned to a segment, a probability that this segment is associated with one or other of the reference curves of FIG. 4.

Conventionally, a motor vehicle comprises a chassis that in particular supports a powertrain, body elements and passenger-compartment elements.

In a rechargeable hybrid vehicle, the powertrain comprises an internal combustion drivetrain and an electric drivetrain.

The internal combustion drivetrain in particular comprises a fuel tank and an internal combustion engine supplied by the tank.

The electric drivetrain for its part comprises a traction battery and one or more electric motors supplied with electric current by the traction battery.

The motor vehicle here also comprises a power plug allowing the traction battery to be charged locally, for example via the mains supply of a dwelling or any other electrical network.

The motor vehicle also comprises auxiliary devices, which are here defined as electrical devices supplied with current by the traction battery.

Among these auxiliary devices, mention may be made of the motor of the air-conditioner, the motors of the electric windows, or even the geo-positioning and navigating system.

This geo-positioning and navigating system conventionally comprises an antenna allowing signals relating to the geo-position of the motor vehicle to be received, a memory allowing a map of a country or a region to be stored, and a screen allowing the position of the vehicle to be illustrated on this map.

Here, the case where this screen is a touch screen allowing the driver to input information will be considered. Of course, it could be otherwise.

Lastly, the geo-positioning and navigating system comprises a controller allowing a route to be traveled to be computed taking into account information input by the driver, the map stored in its memory, and the position of the motor vehicle.

The motor vehicle 1 moreover comprises an electronic control unit (or ECU) in particular allowing the two aforementioned drivetrains (and in particular the powers developed by the electric motor by the internal combustion engine) to be controlled.

In the context of the present invention, this ECU is connected to the controller of the geo-positioning and navigating system, so that these two elements may communicate information to each other.

Here, they are connected together by the main inter-device communication network of the vehicle (typically via the CAN bus).

The ECU comprises a processor and a memory unit (called the memory below).

This memory stores data used in the context of the method described below.

It in particular stores a table of the type illustrated in FIG. 5 (which will be described in more detail below).

It also stores a computer application, consisting of computer programs comprising instructions the execution of which by the processor allows the method described below to be implemented by the ECU.

For the implementation of the invention, the ECU is here connected to a plurality of sensors, which in particular allow the instantaneous fuel consumption of the internal combustion engine, the instantaneous electric current consumption of the one or more electric motors, the instantaneous electric current consumption of the auxiliary devices, and the driving style (sporty, conventional, relaxed, etc.) of the driver of the motor vehicle to be known.

Initially, a plurality of notions used in the description of the method described below will be defined.

Thus, the term "route" may be defined as being a path that the motor vehicle must travel to reach a destination station.

This destination station, end of the route, will considered to be equipped with a charging station allowing the traction battery to be recharged via the power plug with which the vehicle is equipped.

Each route is able to be divided into "adjacent legs" or "adjacent segments".

The notion of legs will be that natively used by the controller with which the geo-positioning and navigating system is equipped.

In practice, each leg corresponds to a portion of the route that lies between two road intersections. To define the shortest or fastest route, the controller will determine through which legs of road the route must pass.

The notion of segments is different. It will be defined in detail below. To simplify, each segment of the route corresponds to one portion of the route, in which portion the characteristics of the road do not change greatly. By way of example, the route could thus be divided into a plurality of segments in each of which the maximum permitted speed remains constant.

Here the route will be considered to be formed from N segments $T^i$, i being an integer comprised between 1 and N.

These segments are characterized by parameters called "attributes cr". The following are examples of attributes cr allowing each segment to be characterized.

A first attribute will be the "road category FC". The controllers with which geo-positioning and navigation systems are equipped generally use this kind of category to distinguish between the various types of road. Here, this category may take an integer value comprised between 1 and 6 (for example). An attribute equal to 1 may correspond to a freeway, an attribute equal to 2 may correspond to a highway, etc.

A second attribute will be the "gradient RG" of the segment, expressed in degrees or in percent.

The third, fourth, fifth and sixth attributes will be relative to the characteristic speeds of the vehicles on the segment.

The third attribute will be the "speed category SC" of the segment. The controllers with which geo-positioning and navigating systems are equipped generally also use this kind of category to distinguish between the various types of road. Here, this category may take an integer value comprised between 1 and 6. An attribute equal to 1 may correspond to a very high speed road (speed limit higher than 120 km/h), and an attribute equal to 2 may correspond to a high-speed road (speed limit comprised between 100 and 120 km/h), etc.

The fourth attribute will be the "maximum permitted speed SL" on the segment.

The fifth attribute will be the "average speed SMS" observed on the segment (the value of which is the result of statistical measurements carried out on each road).

The sixth attribute will be the "instantaneous speed TS" observed on the segment (the value of which is obtained from a system providing information on traffic conditions in real-time).

The seventh attribute will be the "length LL" of the segment.

The eighth attribute will be the "average radius of curvature LC" of the segment.

The ninth attribute will be the "number of lanes NL" that the segment has in the direction of travel of the vehicle.

In the rest of the description, these nine attributes will be used to characterize each segment of the route.

As a variant, each segment of the route may be characterized by a higher or lower number of attributes cr.

Moreover, the state of energy (SOE) of the traction battery will be defined as being a parameter allowing the energy remaining in this traction battery to be characterized. As a variant, another parameter such as the state of charge (SOC) of the battery, or any other parameter of the same type (internal resistance of the battery, voltage across the terminals of the battery, etc.) may be used.

The charge or discharge $\Delta SOE$ of the traction battery will then be considered to be equal to the difference between two states of energy considered at two separate times.

The "specific consumption curve" of the vehicle on a given segment is then defined as being a curve that associates, with each fuel consumption value CC of the vehicle, a value of the charge or discharge $\Delta SOE$ of the traction battery. Specifically, on a given segment, it is possible to estimate what the fuel consumption CC of the vehicle (in liters per kilometer driven) and the charge or discharge of the traction battery (in watt-hours per kilometer) will be. These two values will be related by a curve, since they will vary depending on whether the electric drivetrain or the internal combustion drivetrain is used to make the vehicle advance.

Since there is an infinity of specific consumption curves, lastly "reference curves" are defined as being particular specific consumption curves, the characteristics of which are well known and that allow each specific consumption curve to be approximated. In other words, as the rest of this description will make clearer, each segment of route is associated not with one specific consumption curve, but rather with one reference curve (that which is the best approximation of the specific consumption curve).

In the rest of this description, we will moreover distinguish between estimated information, bearing the index "est", and measured information, bearing the index "mes". Thus information may be estimated on the one hand and measured on the other hand.

The method, which is implemented conjointly by the controller of the geo-positioning and navigating system and by the ECU of the vehicle, is a method for computing settings for managing the fuel and electric current consumption of the vehicle.

This method more precisely consists in determining how, on a predefined route, it will be necessary to use the electric drivetrain and the internal combustion drivetrain in order, for example, to decrease as much as possible the fuel consumption of the vehicle and its polluting emissions over the entirety of the route.

According to one particularly advantageous feature of the invention, the method in summary comprises the following main steps:
  acquiring the route to be traveled,
  dividing the route into successive adjacent segments $T^i$,
  acquiring, for each segment $T^i$, attributes FC, SC, SL, TS, RG, LL NL, SMS characterizing this segment $T^i$,
  determining, for each of the segments $T^i$, taking into account the attributes FC, SC, SL, TS, RG, LL, NL, SMS of this segment $T^i$, a relationship (here called the reference curve $CE_j$) relating each fuel consumption value CC of the hybrid motor vehicle on the segment to a value of the discharge or charge $\Delta SOE$ of the traction battery,
  measuring the actual fuel consumption $CC_{mes}$ and the actual electric energy consumption $\Delta SOE_{mes}$ of the motor vehicle,
  correcting, taking into account said actual fuel consumption $CC_{mes}$ and said actual electric energy consumption $\Delta SOE_{mes}$, said reference curve $CE_j$,
  determining an optimal point $P^i$ of each corrected reference curve $CE_j$, for example allowing the fuel consumption of the hybrid motor vehicle over the entirety of the route to be minimized and a complete discharge of the traction battery to be obtained at the end of said route, and
  generating energy managing settings depending on the coordinates of said optimal points $P^i$.

Details of these steps are given below. Certain thereof may be implemented regularly, for example at regular time intervals along the route of the vehicle, in order to correct as best as possible the energy consumption predictions depending on the energy consumption observed on at least one already driven portion of the route.

Figure 9:
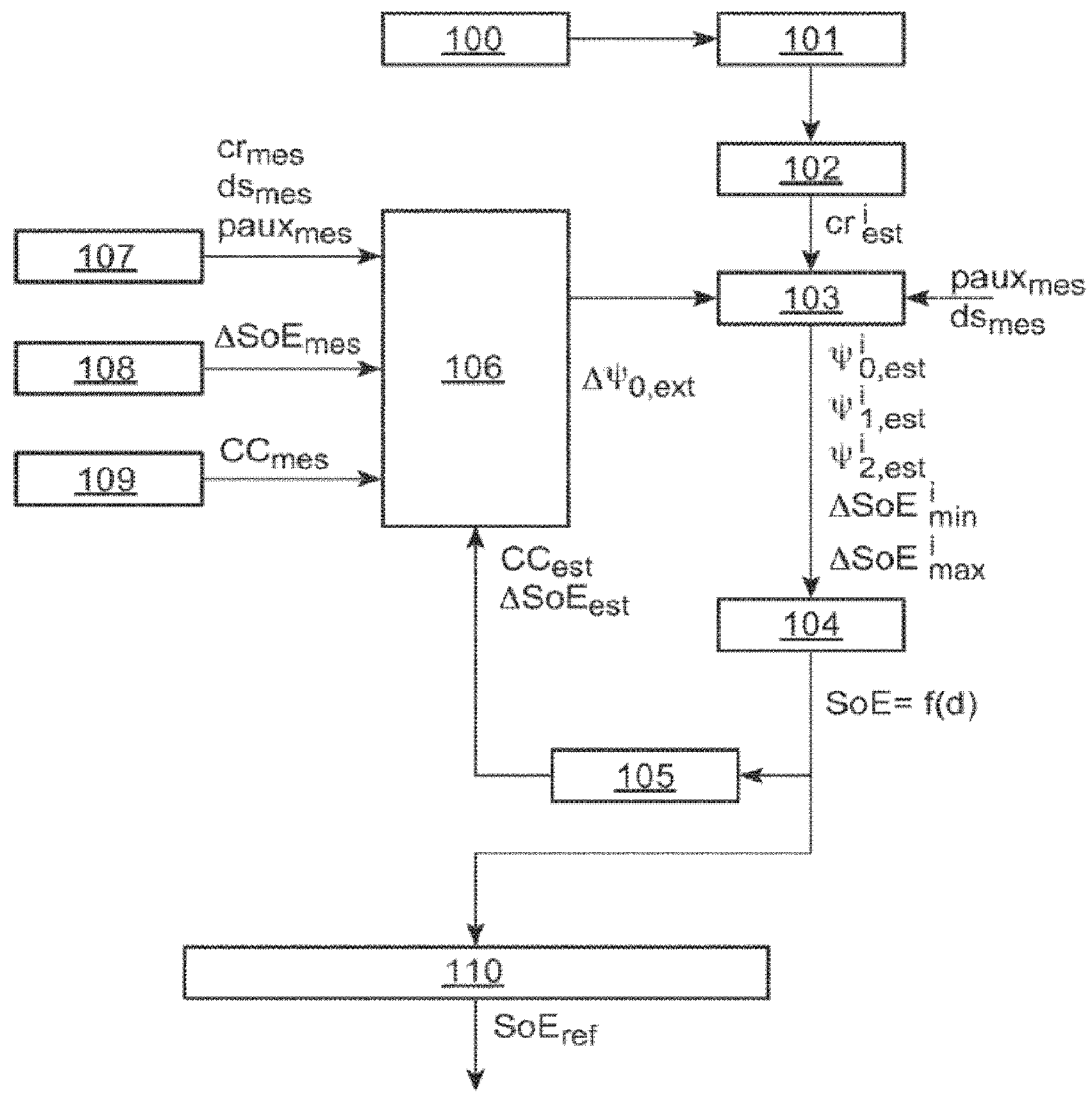
FIG. 9 is a flowchart illustrating the way in which the computing method according to the invention may be implemented.

As shown in FIG. 9, the first step 100 consists in acquiring the route that the motor vehicle must travel.

This step will possibly be carried out by means of the controller integrated into the geo-positioning and navigating system, when the motor vehicle is started up.

This step is then carried out in a conventional way.

Thus, when the driver uses the touchscreen of the geo-positioning and navigating system to define a destination station, the controller of this system computes the route to be traveled, in particular depending on route parameters selected by the driver (fastest route, shortest route, etc.).

At this stage, it will be noted that the method in its entirety will need to be reset if the vehicle begins to travel a route different from that defined by the geo-positioning and navigating system, or even if the conditions, the traffic conditions for example, change.

As a variant, this first step 100 may be carried out in another way.

Thus, it is possible for there to be no need for the driver to input the destination station via the touchscreen. The controller may be able to detect the routines of the driver and to automatically deduce the destination station therefrom.

For example, when the driver takes the same route to work every day of the week, this route may be automatically acquired without the driver having to input any information via the touchscreen of the geo-positioning and navigating system.

At the end of this first step, the controller integrated into the geo-positioning and navigating system knows the route of the vehicle, which is composed of a plurality of adjacent legs, that it will be recalled each extend between two road intersections.

The second step 101 consists in dividing the route into segments $T^i$.

The advantage of re-dividing the route into segments rather than legs is firstly that it decreases the number of subdivisions of the route. Specifically, the attributes of two successive legs are often identical. If these two successive legs were treated separately, the duration of the computations would be needlessly multiplied. By grouping identical legs together within the same segment, it is possible to decrease the duration of the computations.

Another advantage is that the characteristics of the road over a given leg may vary noticeably (one portion of the leg may correspond to a road of zero gradient and another portion of this leg may correspond to a road of high gradient). Here, it is desired to divide the route into segments in each of which the characteristics of the road remain the same.

Each segment $T^i$ will here be defined as being a section of the route that comprises at least one attribute that does not change over the entire length thereof.

This attribute may be the gradient RG and/or the speed category SC and/or the road category FC.

Here, this step will be implemented by the controller integrated into the geo-positioning and navigating system. To this end, the controller will cut the route into segments $T^i$ of maximum lengths in which the three aforementioned attributes (RG, SC, FC) are constant.

At the end of this second step, the controller will have thus defined N segments.

The third step 103 consists in acquiring the attributes $cr^i_{est}$ of each segment $T^i$.

When one of the attributes is variable over the segment in question, it is the average value of this attribute over the entirety of the segment that will be considered.

In practice, this third step is carried out in the following way.

Firstly, the controller integrated into the geo-positioning and navigating system informs the ECU that a new route has been computed. The ECU then requests the attributes of each segment be sent, in the form for example of a table of the type illustrated in FIG. 1.

The controller then acquires the attributes of each segment in the following way.

It computes some thereof, in particular the length LL of the segment.

It reads others thereof from the memory of the geo-positioning and navigating system, in particular the road category FC, the gradient RG, the speed category SC, the maximum permitted speed SL, the average speed SMS, the average radius of curvature LC, and the number of lanes NL.

It has the remainder of these attributes communicated to it by another device, in particular the instantaneous speed TS, which is communicated thereto by the system providing information on traffic conditions in real-time.

The controller then transmits all of this information to the main ECU of the vehicle, via the CAN bus.

The advantage of using the controller integrated into the geo-positioning and navigating system rather than the main ECU of the vehicle to carry out the three first steps is that it decreases the amount of information to be transmitted to the ECU via the CAN bus. Specifically, by merging adjacent legs of the route that have the same attributes, the volume of transmitted data is decreased, this accelerating the transmission of the data via the CAN bus.

Once these attributes $Cr^i/est$ have been received, the ECU implements the remaining steps of the method.

The fourth step 103 consists in determining, for each of the segments $T_i$, the relationship that will allow the energy consumption (fuel and current consumption) of the vehicle on the segment $T_i$ in question to be estimated as best as possible.

This fourth step 103 is here carried out by:
  selecting, from the reference curves $CE_j$ stored in the memory of the ECU, the curve that will allow the energy consumption of the vehicle on the segment $T^i$ in question to be estimated as best as possible, then by
  correcting the selected reference curve $CE_j$ in order to take into account all the data required to ensure that the method is of satisfactory reliability.

This fourth step 103 makes it possible to pass from a characterization of each segment by its attributes, to a characterization by an energy cost.

It is here implemented via five successive operations.

In a first operation of the present example embodiment, the ECU will use the table TAB illustrated in FIG. 5, which is stored in its memory.

As FIG. 5 shows, this table TAB contains rows that each correspond to a value (or to an interval of values) of an attribute. It contains columns each corresponding to one of the reference curves $CE_j$. In the illustrated example, the memory of the ECU will be considered to store M reference curves $CE_j$, with M here equal to eleven. The index j is therefore an integer comprised between 1 and 11.

In FIG. 5, the cells of the table TAB have been left empty since the values that they will contain will depend on the characteristics of the vehicle.

In practice, this table TAB will be stored in the memory of the ECU with values in each of these cells.

These values will be probability values (comprised between 0 and 1) corresponding to the probability that each attribute value corresponds to one or other of the reference curves $CE_j$.

By way of example, if the road category FC of a segment $T^i$ has a value equal to 2, it will be possible to read in the table that the probability that this segment is well characterized in terms of energy cost by the reference curve CE1 will be equal to $a_1$, that the probability that this segment is well characterized in terms of energy cost by the reference curve CE2 will be equal to $a_2$, etc.

It will be noted that the values of the gradient and length attributes, RG and LL respectively, have deliberately not been used in this table TAB.

At this stage, the ECU may then identify each probability value corresponding to the value of each attribute of the segment $T^i$ in question.

In the illustrated example, the attribute FC is considered to be equal to 2, the attribute SC to be equal to 6, the attribute SL to be equal to 30, the attribute NL to be equal to 2, the attribute SMS to be comprised between 60 and 80 and the attribute TS to be comprised between 40 and 60, the ECU identifies the values denoted $a_1$ to $a_{11}$, $b_1$ to $b_{11}$, $c_1$ to $c_{11}$, $d_1$ to $d_{11}$, $e_1$ to $e_{11}$, and $f_1$ to $f_{11}$.

The ECU then takes the sum of the probabilities that the segment $T^i$ in question is well characterized in terms of energy cost by each of the eleven reference curves $CE_j$.

In the illustrated example, the ECU sums, to this end, the values denoted $a_1$ to $f_1$, then $a_2$ to $f_2$, etc.

Lastly, the ECU determines which of the eleven sums gives the highest result.

Then, it concludes that the reference curve $CE_j$ with which this highest probability sum is associated is the reference curve that best characterizes the segment $T^i$ in terms of energy cost.

The ECU may then acquire, from its memory, the values of the parameters characterizing this reference curve $CE_j$.

At this stage of the description, it is possible to discuss in more detail the way in which these reference curves are obtained and modelled.

For each vehicle model (or for each engine/motor model, or for each range of automobile models, or for each range of engine/motor models), it is necessary to perform many test drives (or test-drive simulations) on various geo-positioned segments of road.

These test drives allow the fuel and electric current consumption of the vehicle to be determined on various segments of which the attributes are known. To do this, the vehicle is driven a number of times on each segment, the percentage of the propulsion force delivered by the electric motor being increased each time.

It is then possible to generate a specific consumption curve CCS for each segment. These specific consumption curves are of the type illustrated in FIG. 4.

It may be seen in each of these curves that the more electric energy is used (i.e. for $\Delta SoE<0$), the more fuel consumption decreases, it reaching 0 when a segment is driven exclusively using the electric drivetrain. Conversely, the more it is sought to recharge the battery via the internal combustion engine ($\Delta SoE>0$), the more fuel consumption increases. Lastly, it will be recalled that each specific consumption curve CCS describes the average energy consumption of the vehicle for a situation in which it is being driven on a horizontal road (zero gradient) without any auxiliary devices consuming electricity.

These test drives allow as many specific consumption curves CCS to be found as there are tested segments.

Each specific consumption curve CCS may be modelled by a second order polynomial for which the variations in the charge and discharge $\Delta SOE$ of the traction battery are bounded between a minimum threshold $\Delta SOE_{min}$ and a maximum threshold $\Delta SOE_{max}$—this may be written:

$$\begin{cases} CC = \Psi_2 \cdot \Delta SoE^2 + \Psi_1 \cdot \Delta SoE + \Psi_0 \\ \Delta SoE \in [\Delta SoE\min \ \Delta SoE\max] \end{cases}$$

where $\Psi_0$, $\Psi_1$, $\Psi_2$ are the coefficients of the polynomial.

As the curves of FIG. 4 show, to simplify this modelling, it is possible to make the approximation that the two coefficients $\Psi_1$, $\Psi_2$ are identical from one curve to the next. It is also possible to observe that the minimum threshold $\Delta SOE_{min}$ depends on the three coefficients of the polynomial. Thus, only the coefficient $\Psi_0$ and the maximum threshold $\Delta SOE_{max}$ vary. It is therefore these two values that allow each specific consumption curve CCS to be characterized.

FIG. 3 illustrates points the coordinates of which correspond to these two variables $\Psi_0$ and $\Delta SOE_{max}$. It shows the distribution of the specific consumption curves CCS obtained during the test drives carried out. Here, these points are considered to be distributed in eleven distinct zones. Each zone is defined by its centroid.

Thus, as was described above, in the method, the specific consumption curve that corresponds exactly to the segment in question is not acquired, but rather one of the eleven reference curves the variables $\Psi_0$ and $\Delta SOE_{max}$ of which correspond to the centroid of one of these eleven zones is considered.

At the end of the first operation, each segment $T^i$ is then defined as shown in FIG. 2 by the aforementioned parameters $\Psi_0$, $\Psi_1$, $\Psi_2$, $\Delta SOE_{min}$, $\Delta SOE_{max}$, and by the length $LL_i$ of each segment $T^i$ and by its gradient $RG_i$.

As was explained above, the selected energy curve $CE_i$ takes into account neither the gradient of the segment $T^i$, nor the electric current consumption of the auxiliary devices (motor of the air-conditioner, etc.), nor the driving style of the driver (sporty, relaxed, etc.), nor any other unknown factor (decrease in the pressure of the tires, overloading of the vehicle, etc.).

In order to take into account the gradient of the road, provision is made for a second operation for correcting each selected reference curve $CE_i$ (i.e. the reference curve $CE_i$ assigned to each segment $T^i$) depending on the gradient $RG$ of the segments.

Figure 7:
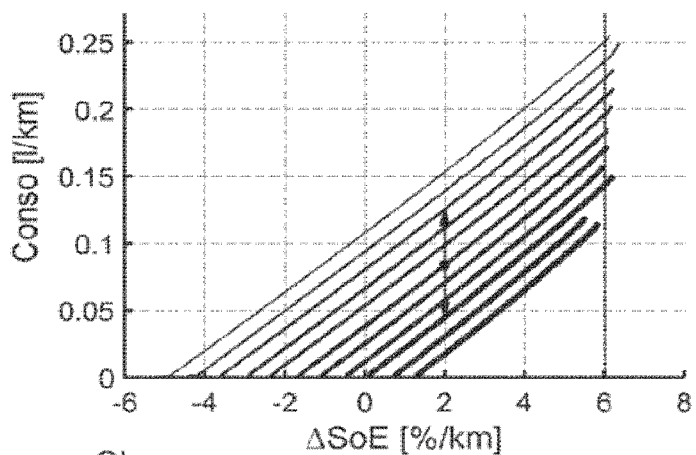
FIG. 7 is a graph illustrating the corrections to be made to a reference curve, to take into account the gradient of the corresponding segment of the route or the behavior of the driver.

As FIG. 7 clearly shows, this correcting second operation consists in simply shifting the reference curve $CE_i$ associated with the segment $T^i$ upward or downward (i.e. at constant charge or discharge $\Delta SOE$), by a value dependent on the gradient $RG$.

Specifically, it will be understood that when the road segment in question slopes upward, the fuel consumption will be higher than initially expected. In contrast, when the road segment in question slopes downward, the fuel consumption will be lower than initially expected.

Furthermore, it will be possible to harvest more electric energy on downward slopes than on upward slopes, during phases in which the brakes are applied.

In practice, this correcting second operation will consist in correcting the parameter $\Psi_0$ using the following formula:

$$\Psi_0 + K \cdot RG^i \Rightarrow \Psi_0$$

where K is a coefficient the value of which depends on the vehicle model in question and on its characteristics (by way of example, K may here be considered to be equal to 0.01327 l.km$^{-1}$).

In order to take into account the driving style of the driver of the motor vehicle, provision is made for a third operation for correcting each reference curve $CE_i$.

Driving style may for example be parameterized by a variable $ds_{mes}$. This variable may for example initially be set equal to zero and may take positive values if the driving style is more sporty than relaxed, or negative values if the driving style is more relaxed than sporty.

As FIG. 7 clearly shows, the operation for correcting each reference curve $CE_i$ consists in simply shifting the reference curve $CE_i$ associated with the segment $T^i$ upward or downward (i.e. at constant charge or discharge $\Delta SOE$), by a value dependent on the variable $ds_{mes}$.

Specifically, it will be understood that when the driving style is sporty, the fuel consumption will be higher than initially expected. In contrast, when the driving style is relaxed, the fuel consumption will be lower than initially expected.

In practice, this correcting third operation will consist in correcting the parameter $\Psi_0$ using the following formula:

$$\Psi_0 + ds_{mes} \Rightarrow \Psi_0.$$

In order to take into account the electric current consumption of the auxiliary devices, provision is made for a fourth operation for correcting each reference curve $CE_i$ depending on the electric power $paux_{mes}$ consumed by the auxiliary devices.

Figure 6:
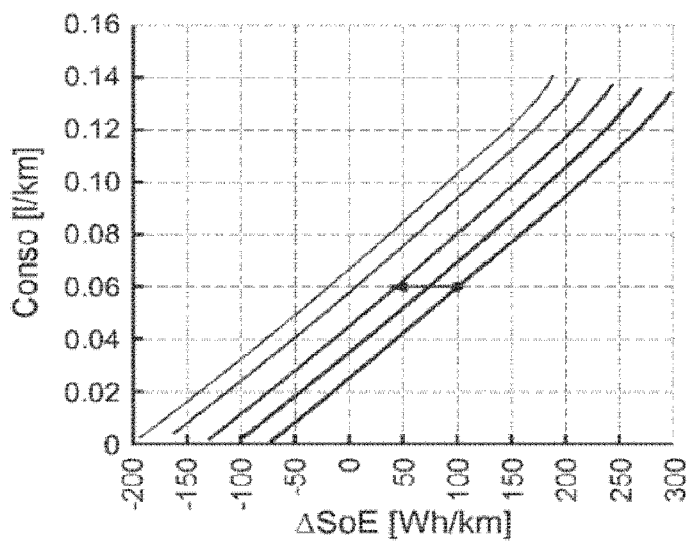
FIG. 6 is a graph illustrating the corrections to be made to a reference curve, to take into account the electric consumption of auxiliary devices of the vehicle.

As is clearly shown in FIG. 6, this correcting operation simply consists is in shifting the reference curve $CE^i_i$ associated with the segment $T^i$ leftward (i.e. at constant fuel consumption), by a value dependent on the electric power $paux_{mes}$.

Specifically, it will be understood that when the electric devices are being used, the charge of the battery will be slower than expected and the discharge of this battery will be faster than expected.

In practice, the correcting step will consist in shifting the reference curve $CE_j$ by a value $E_{AUX}$ computed using the following formula:

$$E_{AUX} = \frac{paux_{mes}}{\overline{v}}$$

where $\overline{v}$ is the average speed over the segment (in km/h). This value may be delivered directly by the geo-positioning and navigating system, which will estimate it to be equal to the value of the speed of the traffic or to the statistical average speed or to the maximum permitted speed.

At the end of this fourth operation, each segment $T^i$ is then defined by the parameters $\Psi^i_{0,est}$, $\Psi^i_{1,est}$, $\Psi^i_{2,est}$, $\Delta SOE^i_{min}$, $\Delta SOE^i_{max}$.

At this stage, it will be noted that the aforementioned way of obtaining these parameters is given merely by way of example. Provision could in particular be made for a solution not using a table such as that shown in FIG. 5.

Thus, in a more general variant, the coefficients $\Psi^i_{0,est}$, $\Psi^i_{1,est}$, $\Psi^i_{2,est}$ could thus be computed using an energy model calibrated during the phase of development of the strategy (off-line), and it would then be possible to write:

$$\Psi^i_{0,est} = f_0(cr^i_{est}, ds_{mes}, paux_{mes}),$$

$$\Psi^i_{1,est} = f_1(cr^i_{est}, ds_{mes}, paux_{mes}),$$

$$\Psi^i_{2,est} = f_2(cr^i_{est}, ds_{mes}, paux_{mes}),$$

The relationships $f_0$, $f_1$ and $f_2$ may for example be derived from modelling of a set of categories of energy consumption, in which the choice of a category depends on the probability that the leg of road belongs thereto (as in the aforementioned case), but these categories may also be of any other nature.

As will be described below, once the vehicle has started to travel the route, provision will be made for a fifth operation for correcting the parameters estimated up to then, in order to take into account any other unknown factor (decrease in the pressure of the tires, overloading of the vehicle, etc.).

Since at this stage, the vehicle is considered to not yet have set off, this fifth operation will not be implemented here and will not be described. It will however be described in detail below.

The fifth step 104 of the method then consists in determining, on each corrected reference curve $CE_j$, the optimal point $P^i$ that will here allow the fuel consumption of the hybrid motor vehicle over all of the route to be minimized and a complete discharge of the traction battery at the end of said route to be obtained.

This step is here carried out by means of an A* optimization algorithm. It is a question of an algorithm known in the art and that will therefore not be described in detail here. The operation thereof will however be briefly explained.

Figure 8:
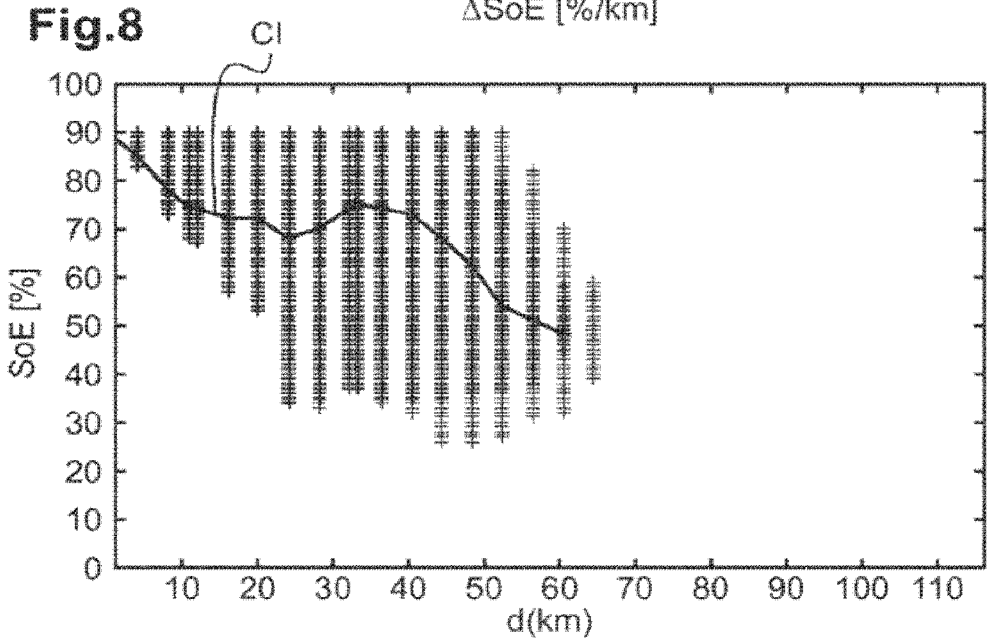
FIG. 8 is a graph illustrating various points for each reference curve associated with each segment and a curve passing through the optimal points of these reference curves.

To do so, reference is made to FIG. 8.

It may be seen therein that for each segment $T^i$ a series of points is drawn passing through states of energy SOE parallel to the ordinate axis, at an abscissa equal (in kilometers) to the distance between the location in which the vehicle is located and the end point of the segment. Each point on this line corresponds to an achievable state of energy SOE deduced from the reference curve $CE_j$ associated with this segment $T^i$. The space of the states of energy SOE is discretized into a finite number of points.

The ordinate of each point is then equal to the state of energy SOE of the traction battery that would remain at the end of the segment $T^i$ if the vehicle were driven according to the corresponding point of the reference curve $CE_j$, given the charge or discharge applied to the traction battery.

Each point therefore forms a node n.

The objective of the A* algorithm is then to find the path CI that will allow the fuel consumption of the vehicle to be minimized.

The choice of the order of exploration of the nodes n is determined by attempting to minimize a function k that is the sum of a cost function g and a heuristic function h, as the following formula shows:

$$k(n)=g(n)+h(n)$$

where g(n) is the amount of fuel required to reach the node n from the start node (start of the route) on the best available trajectory, depending on the choices made with respect to the charge or discharge $\Delta SOE$ to be applied to the battery over the preceding segments, and where h(n) is an optimistic estimation of the amount of fuel left to consume with a charge or discharge $\Delta SOE$ that could be applied to the traction battery in order to pass from the node n to the end node, the discharge of the traction battery from the node n being considered to be linear.

The function k allows the algorithm to explore, in each computational iteration, the trajectory that both minimizes the cost of reaching the current node and also minimizes the cost of reaching the end of the route from this node.

Thus, use of the function k incites this algorithm to explore only trajectories close to the optimal trajectory, this limiting the exploration of sub-optimal trajectories, this allowing good results to be obtained in a minimum number of computational iterations.

The function illustrated in FIG. 8 and which shows the optimal path passing through the optimal points $P^i$ of the reference curves $CE_j$ is denoted SoE=f(d), with d the distance traveled since the start of the route.

Once the optimal path has been found (i.e. the path passing through the optimal points $P^i$), the ECU generates energy managing settings $SoE_{ref}$ depending on the coordinates of the optimal points $P^i$.

These energy managing settings are then used throughout the route by the ECU to track the trajectory, so that the state of energy SOE of the traction battery follows the path CI illustrated in FIG. 8.

A plurality of methods allow such tracking to be carried out. One example is particularly well illustrated in patent application FR2988674 filed by the applicant, or also in documents WO2013150206 and WO2014001707

Once the vehicle has started to travel the route indicated by the geo-positioning and navigating system, the ECU repeats again and again the aforementioned steps 103 and 104, conjointly with steps 105 to 109 that will now be described in detail.

This repetition of steps 103 and 104 will allow the quality of the estimation of the energy consumption of the vehicle on the rest of the route to be traveled to be optimized, in particular by virtue of the fifth operation that will be implemented in step 103.

Thus, in a sixth step 105, the ECU determines an estimation of the fuel consumption $CC_{est}$ and of the electric consumption $\Delta SoE_{est}$ of the vehicle in a past and preset time window.

This time window may for example correspond to the time interval that was necessary to travel one of the segments $T^i$ of the route, or one portion of one of the segments, or a plurality of segments.

By way of example, for the sake of clarity of the description, this time window may be considered to correspond to the time that was required to travel the two preceding segments, denoted $T^{t-2}$, $T^{t-1}$ ($T^t$ denoting the segment that the vehicle is in the process of travelling).

However, preferably, the size of the window will be chosen independently of the length of the segments. It will be a length of time that allows a sufficiently stable average energy consumption to be recorded, compatible with the dynamic range of the predictive energy model.

To compute on average an estimation of the fuel consumption $CC_{est}$ and of the electric consumption $\Delta SoE_{est}$ of the vehicle in this time window, the ECU uses the values of the optimal points $P^i$ associated with these segments. The ECU is then able to determine the specific consumption curve that relates an estimation of the fuel consumption $CC_{est}$ and an estimation of the electric consumption $\Delta SoE_{est}$ of the vehicle in the whole of the chosen time window.

The ordinate at the origin of this specific consumption curve, denoted $\Psi^*_{0,est}$, may then be computed using the following mathematical relationship:

$$\Psi^*_{0,est}=CC_{est}-(\psi_{2,mes}\cdot\Delta SoE_{est}^2+\Psi_{1,mes}\cdot\Delta SoE_{est})$$

Next, by virtue of sensors with which the vehicle is equipped, in steps 107, 108 and 109, the ECU is able to obtain:

new measurements of the electric power $paux_{mes}$ consumed by the auxiliary electrical devices, and of the parameter $ds_{mes}$ relative to the style with which the vehicle is driven by the driver, an average of the actual fuel consumption $CC_{mes}$ of the internal combustion engine in the chosen time window, and an average of the actual electrical consumption $\Delta SoE_{mes}$ of the vehicle in said time window.

In the way explained above, in a step 106, the ECU is able to determine the specific consumption curve that relates these two estimations of actual fuel consumption $CC_{mes}$ and of actual electric consumption $\Delta SoE_{mes}$.

The ordinate at the origin of this curve, denoted $\Psi^*_{0,mes}$, may then be computed using the following mathematical relationship:

$$\Psi^*_{0,mes} = CC_{mes} - (\Psi_{2,mes} \cdot \Delta SoE_{mes}^2 + \Psi_{1,mes} \cdot \Delta SoE_{mes})$$

Once again, the coefficients $\psi_{2,mes}$ and $\psi_{1,mes}$ are invariable and known, and hence the parameter $\Psi^*_{0,mes}$ is easily computable.

It is then possible to compute an error $\Delta \Psi_{0,ext}$ between the values estimated in steps 103 and 104 and the measured values. This error is obtained using the following mathematical relationship:

$$\Delta \Psi_{0,est} = \Psi^*_{0,mes} - \Psi^*_{0,est}$$

This error will possibly be used in the subsequent time interval, and more precisely the next time the step 103 is implemented by the ECU.

To do this, in the fifth operation defined above, provision will be made to correct each reference curve $CE^i$ depending on said error $\Delta \Psi_{0,ext}$.

As FIG. 7 clearly shows, this fifth operation will consist in simply shifting the reference curve CEj associated with the segment $T^i$ upward or downward (i.e. at constant charge or discharge $\Delta SOE$), by a value dependent on the error $\Delta \Psi_{0,ext}$.

In practice, this correcting second operation will consist in correcting the parameter $\Psi_0$ using the following formula:

$$\Psi_0 + \Delta \Psi_{0,ext} \Rightarrow \Psi_0$$

The present invention is in no way limited to the embodiment described and shown, and those skilled in the art will be able to envision many variants according to the invention.

In particular, in the case where the geo-positioning and navigating system does not know the value of an attribute of a segment of the route, provision will possibly be made:

either for the computation of the sums of probabilities to not take into account the values of the probabilities assigned to this attribute, or for the computation to replace the unknown value with a preset value.

The invention claimed is:

1. A method for computing settings for managing consumption of fuel and of electric current of a hybrid motor vehicle comprising at least one electric motor that is supplied with electric current by a traction battery, and an internal combustion engine supplied with fuel, the method comprising:
   a) acquiring, via a navigation system, a route to be travelled;
   b) dividing said route into successive segments;
   c) acquiring, for each of the segments, attributes characterizing said segment;
   d) for each of said segments and taking into account the attributes thereof, acquiring a relationship relating an estimated fuel consumption of the hybrid motor vehicle on the segment to an estimated electric energy consumption;
   e) measuring an actual fuel consumption and an actual electric energy consumption of the motor vehicle;
   f) correcting, taking into account said actual fuel consumption and said actual electric energy consumption, each relationship;
   g) determining an optimal consumption point in each of the corrected relationships; and
   h) generating energy managing settings throughout the route, depending on the coordinates of said optimal points,
   wherein step d) comprises selecting, from a plurality of predetermined relationships relating fuel consumption values to electric energy consumption values, the relationship that corresponds to the attributes characterizing said segment, and
   wherein, in step d), the relationship is selected independently of electric current consumption of auxiliary devices that are distinct from the electric motor and that are supplied with current by the traction battery, and
   wherein, prior to step f), provision is made for a step d2) of correcting said relationship to take into account a parameter relating to said electric current consumption of the auxiliary devices.

2. The computing method as claimed in claim 1, wherein the auxiliary devices include at least one of a motor of an air-conditioner, a motor of an electric window, and a geo-positioning and navigating system.

3. The computing method as claimed in claim 1, wherein the predetermined relationships are polynomials and wherein step f) comprises revising the value of the ordinate at the point of origin of the selected polynomial.

4. The computing method as claimed in claim 3, wherein the value of the ordinate of the selected polynomial is revised by adding thereto a variable that is equal to the difference between the value of the ordinate at the point of origin of a polynomial relating the actual fuel consumption of the hybrid motor vehicle to an actual electric energy consumption over at least one portion of an already travelled segment, and the value of the ordinate at the point of origin of the selected polynomial over said at least one portion of the already travelled segment.

5. The computing method as claimed in claim 3, wherein the polynomials are of second-order and wherein the variations in the charge and discharge of the traction battery are bounded between a minimum threshold and a maximum threshold.

6. The computing method as claimed in claim 5, wherein said polynomials have two invariable coefficients and an ordinate value at the point of origin that varies from one polynomial to the next.

7. The computing method as claimed in claim 1, wherein, in step d), the relationship is selected independently of a gradient of said segment, and wherein, prior to step f), provision is made for a step d1) of correcting said relationship to take into account said gradient.

8. The computing method as claimed in claim 1, wherein, in step d), the relationship is selected independently of the way in which the driver is driving the motor vehicle, and wherein, prior to step f), provision is made for a step d3) of correcting said relationship to take into account a parameter relating to said way in which the driver is driving the motor vehicle.

9. The computing method as claimed in claim 1, wherein the attributes of each of the segments include at least one of a road category, a gradient, a speed category, a maximum permitted speed, an average speed, an instantaneous speed, a length, an average radius of curvature, and a number of lanes.

10. The computing method as claimed in claim 1, wherein, in step g), the optimal points are chosen such that they minimize the fuel consumption of the hybrid motor vehicle over all of the route and maximize the discharge of the traction battery at the end of said route.

* * * * *